United States Patent Office 3,470,240
Patented Sept. 30, 1969

3,470,240
13,14-SECO-STEROIDS AND PROCESS FOR PREPARATION THEREOF
Georg Anner and Jaroslav Kalvoda, Basel, Switzerland, assignors to Ciba Corporation, New York, N.Y., a corporation of Delaware
No Drawing. Filed Aug. 17, 1965, Ser. No. 480,513
Claims priority, application Switzerland, Sept. 4, 1964, 11,599/64
Int. Cl. C07c 69/12, 171/07
U.S. Cl. 260—488                                                15 Claims

ABSTRACT OF THE DISCLOSURE

Manufacture of new 13-iodo-14-oxo-13,14-secosteroids and of their reduction and condensation products, in which a 14-hydroxysteroid that does not contain an additional oxidizable hydroxyl group is reacted with a compound containing monovalent, positive iodine, and, if desired, the resulting 13-iodo-14-oxo-13,14-secosteroid is reductively condensed to the 14β-hydroxysteroid and/or at any stage of the process any protected oxo or hydroxyl groups present in the process products are liberated and/or hydroxyl groups are etherified or esterified. Also included are the products obtained, which are useful as intermediates for making known, pharmacologically-active compounds and/or as androgenanabolics and antiestrogens.

---

The present invention relates to the manufacture of new 13-iodo-14-oxo-13,14-secosteroids and of their reduction and condensation products. According to the new process for their manufacture a 14-hydroxysteroid that does not contain an additional oxidizable hydroxyl group is reacted with a compound containing monovalent, positive iodine, and, if desired, the resulting 13-iodo-14-oxo-13,14-secosteroid is reductively condensed to the 14β-hydroxysteroid and/or at any stage of the process any protected oxo or hydroxyl groups present in the process products are liberated and/or hydroxyl groups are etherified or esterified.

Compounds containing monovalent, positive iodine are, for example, N-iodocarboxylic acid amides or imides, such as N-iodoacetamide or N-iodosuccinimide, advantageously in the presence of free iodine, cyanogen iodide, iodine halides such as iodine chloride or bromide, 4-iodo-1,3-dimethoxy-benzene in the presence of a Lewis acid such as boron trifluoride, diiodoacetylene and especially hypoiodous acid and its derivatives, for example alkyl and acyl hypoiodites. Alkyl hypoiodites are advantageously prepared by reacting iodine with alkanols, especially lower alkanols such as methanol, ethanol, propanol or butanol, in the presence of a heavy-metal oxide such as silver, mercury or lead oxide. Acyl hypoiodites are advantageously prepared by the reaction of iodine on heavy-metal acylates, especially those of lower aliphatic, cycloaliphatic, monocyclic-aromatic or aralipathic carboxylic acids such as acetic, trifluoroacetic, propionic, hexahydrobenzoic, benzoic or phenylacetic acid with silver, mercury or lead. According to a particularly useful method the acyl hypoiodites are formed by reacting iodine upon an acylate of tetravalent lead, for example dialkyl lead acylate or especially a lead tetraacylate, for example one of the above mentioned carboxylic acids. Mixtures of iodine and a heavy metal oxide, such as mercuric oxide, can also be used to form monovalent positive iodine. In many cases it is advantageous to manufacture the iodine reagent, especially the acyl hypoiodites, in the manner indicated above and in the presence of the 14-hydroxysteroid used as starting material, that is to say in the reaction mixture.

As starting materials for the present process there are suitable 14α- or 14β-hydroxysteroids, for example those of the androstane, pregnane, cholane, cholestane, stigmastane, spirostane, cardanolide or bufadienolide series which may contain in the ring system and in the side chain one or several additional substituents and/or one or several double bonds, for example free or functionally converted oxo groups, esterified or etherified hydroxyl groups, oxido groups, lower saturated or unsaturated aliphatic hydrocarbon radicals and/or halogen atoms. Functionally converted oxo groups are, for example, ketal, enolether or enolester groups, especially lower alkylenedioxy groups such as ethylenedioxy or 1,2-propylenedioxy groups. Etherified hydroxyl groups are above all lower alkoxy such as methoxy or ethoxy groups or the tetrahydropyranyloxy group and esterified hydroxyl groups, especially acyloxy groups or carboxylic or sulfonic acids containing 1 to 20 carbon atoms, for example formic, acetic, trifluoroacetic, propionic, butyric, trimethylacetic, caproic, oenanthic, capric, undecylenecarboxylic, hexahydrobenzoic, cyclopentylpropionic, phenylpropionic, benzoic, furoic or ethylcarbonic acid, or of methanesulfonic, ethanesulfonic, benzenesulfonic or para-toluenesulfonic acid. Lower aliphatic hydrocarbon radicals are, for example, lower alkyl, alkylene, alkenyl or alkinyl groups such as the methyl, ethyl, propyl, isopropyl, methylene, vinyl, allyl, ethinyl or propargyl group. Halogen atoms are above all fluorine, chlorine or bromine atoms.

Preferred starting materials are those of the formula

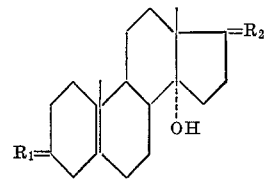

where $R_1$ represents an oxo or lower alkylenedioxy group, or a hydrogen atom and an α- or β-positioned lower alkanoyl-oxy group, and $R_2$ an oxo or lower alkylenedioxy group, or hydrogen and a β-positioned lower alkanoyloxy, a 2-oxo-2,5-dihydrofuryl-(4) or 2-oxo-pyranyl-(5) radical, or a β-positioned hydroxyl or lower alkanoyloxy group and a lower aliphatic hydrocarbon radical—their dehydro derivatives containing a double bond starting from the C5 carbon atom and the 1(2)-dehydro derivatives of these compounds.

The present process can be performed, for example, thus: The starting material is dissolved or suspended in a solvent that is inert towards the iodine reagent, for example, in a hydrocarbon such as benzene or toluene, or especially in a cycloalkane such as cyclohexane, methyl- or dimethylcyclohexane, or in a halogenated hydrocarbon such as carbon tetrachloride or hexachlorobutadiene, whereupon a lead tetraacylate, advantageously lead tetraacetate, iodine and, if desired, also a basic agent, for example an alkaline earth metal carbonate such as calcium carbonate or a tertiary nitrogen base such as pyridine are added, and the reaction mixture is stirred in the presence or absence of an inert gas at room temperature or with heating, advantageously at the boiling point of the solvent used, until the iodine coloration fades away. The reaction can be accelerated by irradiating the reaction mixture with visible and/or ultraviolet light or with the aid of catalysts, namely the radical starters known for use in lead tetraacylate-iodine reactions such as α:α'-azodiisobutyronitrile. In a similar or suitably modified manner the present process can also be performed with the other iodine reagents.

In the resulting 13-iodo-14-oxo-13,14-secosteroids the iodine can be eliminated by reduction, for example with the use of metallic reducing agents, especially with zinc and an acid, advantageously a lower fatty acid such as acetic or propionic acid, or an alcohol, for example a lower alkonol such as methanol or ethanol, or an alkali metal or alkaline earth metal, such as lithium, sodium or calcium, and ammonia or an amine, for example a lower aliphatic amine such as methylamine, ethylamine, isopropylamine or ethylenediamine.

Under the reaction conditions described above $14\beta$-hydroxysteroids are formed. Thus the new process provides an easy way to form the pharmacologically interesting $14\beta$-hydroxysteroids starting from $14\alpha$-hydroxysteroid. Other reducible groups, for example oxido or oxo groups, may be reduced simultaneously with the reductive condensation.

Any protected oxo or hydroxyl groups present in the products of the present process, for example ketalized oxo groups, or esterified or etherified hydroxyl groups, can be liberated in the known manner, ketal and ether groupings advantageously by acid hydrolysis and ester groupings by alkaline hydrolysis or hydrogenolysis. The latter can be carried out, if desired, simultaneously with the reductive condensation. A resulting hydroxy compound can be esterified by a known method, for example with a reactive functional derivative of a carboxylic or sulfonic acid, e.g. with the anhydrides or halides of the acids mentioned above, or it can be etherified, for example with a lower alkylhalide or dihydropyran.

The invention includes also any modification of the present process in which an intermediate obtained at any stage of the process is used as starting material and any remaining steps are carried out or in which a starting material is formed under the reaction conditions or is used in the form of a salt or other derivative thereof.

The starting materials are known or, insofar as they are new, they can be prepared by known methods; see, for instance, J. Amer. Chem. Soc. 80, page 3382 [1958] or Belgian Patents Nos. 611,651 and 611,652 granted June 18, 1962 to Ciba Societe Anonyme, Basel, Switzerland. The new 13-iodo-14-oxo-13,14-secosteroids, e.g. those having the same substituents as are present in the compounds of Formula I can be used as intermediates for the manufacture of other pharmacologically active compounds. Thus, for example, it is possible to convert by this this invention $14\alpha$-hydroxysteroids into $14\beta$-hydroxysteroids, some of which—for example $\Delta^4$-3,17-dioxo-$14\beta$-hydroxyandrostene and $\Delta^4$-3-oxo-$14\beta$,$17\beta$-dihydroxyandrostene—are still new. These compounds act as androgenanabolics and antiestrogens.

Moreover the known $14\beta$-hydroxy-steroids of the cardanolide group, to which belong aglucones of important cordiac glycolsides, may be manufactured according to the process of the invention.

The following examples illustrate the invention without thereby limiting its scope.

Example 1

A suspension of 12 g. of lead tetraacetate and 3.2 g. of calcium carbonate in 200 ml. of cyclohexane is heated for a short time at 80° C., then mixed with 2.8 g. of iodine and 1.58 g. of $\Delta^4$-3,17-dioxo-$14\alpha$-hydroxyandrostene and refluxed and stirred for one hour while being irradiated with a 500 watt lamp. The reaction mixture, which is still faintly pinkish, is cooled, inorganic constituents are filtered off, the filter residue is washed with cyclohexane and ether; the filtrate is successively agitated with water, 5% sodium thiosulfate solution and with water, dried, and evaporated under a water-jet vacuum below 40° C.

There are obtained 2.6 g. of a partially crystalline crude product which, according to its thin-layer chromatogram (eluant: benzene+ethyl acetate 1:1) contains pure $\Delta^4$-3,14,17-trioxo-13$\xi$-iodo-13,14-secoandrostene and some reaction products of cyclohexane. The compound can be obtained pure in the form of fine rodlets by direct crystallization from methylene chloride+ether+petroleum ether (preferably in a water-jet vacuum). It melts at 117°–120° C. with decomposition. Its infrared spectrum contains bands, inter alia, at 5.90, 5.98, 6.20, 9.12, 9.43 and 10.75$\mu$. The nuclear magnetic resonance spectrum conforms with the constitution defined above. The compound cannot be stored for a prolonged period at room temperature, especially when exposed to light.

Example 2

A solution of 1.25 g. of crude $\Delta^4$-3,14,17-trioxo-13$\xi$-iodo-13,14-secoandrostene in 30 ml. of 98% acetic acid is mixed with 15 g. of zinc dust and stirred for 2 hours at 60° C. The cooled reaction mixture is diluted with methylene chloride, freed from inorganic matter by filtration, and the filtrate is evaporated in a water-jet vacuum. The residue is dissolved in methylene chloride, and the solution is washed neutral with water, dried and evaporated in a water-jet vacuum. The residue (782 mg.) consists substantially of pure, yellowish $\Delta^4$-3,17-dioxo-$14\beta$-hydroxyandrostene which melts at 137° and 220° to 222° C. after crystallization from benzene or methylene chloride+acetone. Its infrared spectrum contains bands, inter alia, at 2.78, 5.77, 6.00, 6.20, 8.40, 9.25, 10.50 and 11.55$\mu$. Optical rotation $[\alpha]_D^{20} = +106°$ (c.$=$0.895% in chloroform).

Example 3

By the method described in the foregoing examples $\Delta^4$-3-oxo-$14\alpha$-hydroxy-$17\beta$-acetoxyandrostene yields $\Delta^4$-3,14-dioxo-13-iodo-$17\beta$-acetoxy-13,14-secoandrostene which latter gives rise to $\Delta^4$-3-oxo-$14\beta$-hydroxy-$17\beta$-acetoxyandrostene and, if desired, after conventional hydrolysis, $\Delta^4$-3-oxo-$14\beta$,$17\beta$-dihydroxy-androstene.

The starting material can be prepared thus:

A solution of 3.0 g. of $\Delta^4$-3-17-dioxo-$14\alpha$-hydroxy-androstene in a mixture of 30 ml. of absolute dioxane, 6.0 ml. of orthoformic acid ester and 0.3 ml. of absolute ethanol is mixed with 1.5 ml. of a solution of 0.25 ml. of concentrated sulfuric acid in 5 ml. of absolute dioxane and stirred for 30 minutes at 22° C. The brown reaction mixture is mixed with 10 ml. of pyridine and evaporated in a high vacuum at about 35° C. The residue is taken up in methylene chloride and washed with sodium bicarbonate solution and water, dried, mixed with 2 drops of pyridine and evaporated in a water-jet vacuum. After recrystallization from methylene chloride+ether the crude product yields 2.78 g. of $\Delta^{3,5}$-3-ethoxy-$14\alpha$-hydroxy-17-oxo-androstadiene melting at 204° to 207°. 2.58 g. of this product are dissolved in 100 ml. of tetrahydrofuran and the solution and 4 ml. of water in 10 ml. of tetrahydrofuran, 10 g. of lithium aluminum hydride in 60 ml. of tetrahydrofuran. The reaction mixture is refluxed for 30 minutes, cooled, the excess reducing agent is decomposed by careful addition of 4 ml. of ethyl acetate in 10 ml. of tetrahydrofuran and 4 ml. of water in 10 ml. of tetrahydrofuran, 10 g. of anhydrous sodium sulfate are added, and the inorganic matter is filtered off. The filtrate yields after having been evaporated in a water-jet vacuum 2.65 g. of crude $\Delta^{3,5}$-3-ethoxy-$14\alpha$,$17\beta$-dihydroxyandrostadiene. Its infrared spectrum displays bands, inter alia, at 2.82, 6.07, 6.16, 8.23, 8.03, 9.58 and 11.70$\mu$.

The resulting product is dissolved in 15 ml. of pyridine and 15 ml. of acetic anhydride and the mixture is kept for 16 hours at 20° C. While cooling the reaction solution it is mixed with excess methanol and evaporated under a high vacuum, to yield 3.10 g. of crude $\Delta^{3,5}$-3-ethoxy-$14\alpha$-hydroxy-$17\beta$-acetoxyandrostadiene which crystallizes on being sprinkled with ether or acetone. Its infrared spectrum contains bands, inter alia, at 2.78, 5.78, 6.06, 6.12, 8.20, 8.53 and 9.67$\mu$. The crude product is dissolved in 15 ml. of 66% acetic acid and the solution heated for 30 minutes at 70° C., then diluted with water, extracted with ether; the organic layer is washed with water, ice-cold dilute sodium hydroxide solution and with water until the washings run neutral, dried and evaporated in a water-jet vacuum. Yield: 2.65 g. of a colorless, amorphous substance which is dissolved in benzene and chromatographed on 50 times its own weight of silica gel, to yield pure $\Delta^4$-3-oxo-14α-hydroxy-17β-acetoxyandrostene. Its infrared spectrum contains bands, inter alia at, 2.78, 5.78, 6.00, 6.20, 8.15, 9.60 and 9.84μ.

What is claimed is:

1. Process for the manufacture of 13-iodo-14-oxo-13,14-secosteroids, wherein a 14-hydroxy-steroid selected from the group consisting of steroids of the androstane, pregnane, cholane, cholestane, stigmastane, spirostane, cardanolide and bufanolide series devoid of further oxidizable hydroxyl groups is reacted with a compound yielding monovalent, positive iodine in an inert organic solvent.

2. Process according to claim 1, wherein as a compound yielding monovalent positive iodine there is used an N-iodocarboxylic acid amide in the presence of free iodine.

3. Process according to claim 1, wherein as a compound yielding monovalent positive iodine there is used an N-iodocarboxylic imide in the presence of iodine.

4. Process according to claim 1, wherein as a compound yielding monovalent positive iodine there is used an alkylhypoiodite.

5. Process according to claim 1, wherein as a compound yielding monovalent positive iodine there is used an acylhypoiodite.

6. Process according to claim 1, wherein as a compound yielding monovalent positive iodine there is used a mixture of mercuric oxide and iodine.

7. Process according to claim 5, wherein the acrylhypoiodite is formed by using a mixture of a oxidizing heavy metal acylate and iodine.

8. Process according to claim 7, wherein there is used a lead tetraacylate and iodine.

9. Process according to claim 8, wherein there is used lead tetraacetate and iodine.

10. Process according to claim 9, wherein there is used a cycloalkane as solvent.

11. Process according to claim 10, wherein there is used cyclohexane as solvent.

12. Process as claimed in claim 1, wherein the reaction mixture is irradiated with ultraviolet light.

13. A member selected from the group consisting of a compound of the formula

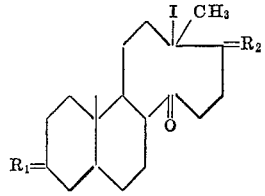

wherein $R_1$ is a member selected from the group consisting of an oxo group, a hydrogen atom together with a hydroxyl group, a hydrogen atom together with a lower alkanoyloxy group, $R_2$ is a member selected from the group consisting of an oxo group, a hydrogen atom together with a β-hydroxy group, a hydrogen atom together with a β-lower alkanoyloxy group, a β-hydroxy group together with a lower aliphatic hydrocarbon radical, and a β-lower alkanoyloxy group together with a lower aliphatic hydrocarbon radical, and a dehydro derivative thereof having a 4:5-double bond.

14. $\Delta^4$-3,14,17-trioxo-13-iodo-13,14-secoandrostene.

15. $\Delta^4$-3,14 - dioxo - 13 - iodo - 17β - acetoxy - 13,14-secoandrostene.

References Cited

Chem. Absts. I, 56: 14353–14354 (1962).
Chem. Absts. II, 62: 1714 (1965).
Chem. Absts. III, 62: 605 (1965).

LORRAINE A. WEINBERGER, Primary Examiner

V. GARNER, Assistant Examiner

U.S. Cl. X.R.

204—158; 260—210.5, 340.6, 340.9, 345.8, 345.9, 347.5 397.45, 410, 456, 463, 468, 476, 487, 586, 999